(12) United States Patent
Gresset et al.

(10) Patent No.: US 10,711,905 B2
(45) Date of Patent: Jul. 14, 2020

(54) VALVE FOR PRESSURIZED ENVIRONMENTS

(71) Applicant: SCHRADER, Pontarlier (FR)

(72) Inventors: Benoit Gresset, Arbois (FR); Sébastien Robert, Besancon (FR)

(73) Assignee: SCHRADER, Pontarlier (FR)

( * ) Notice: Subject to any disclaimer, the term of this patent is extended or adjusted under 35 U.S.C. 154(b) by 255 days.

(21) Appl. No.: 15/569,992

(22) PCT Filed: Mar. 31, 2016

(86) PCT No.: PCT/FR2016/050734
§ 371 (c)(1),
(2) Date: Apr. 26, 2018

(87) PCT Pub. No.: WO2016/174323
PCT Pub. Date: Nov. 3, 2016

(65) Prior Publication Data
US 2018/0224008 A1  Aug. 9, 2018

(30) Foreign Application Priority Data
Apr. 30, 2015 (FR) .................................. 15 53945

(51) Int. Cl.
*F16K 17/00* (2006.01)
*F16K 15/06* (2006.01)
(Continued)

(52) U.S. Cl.
CPC ............. *F16K 15/063* (2013.01); *F16F 1/08* (2013.01); *F16K 1/02* (2013.01); *F16K 1/2071* (2013.01);
(Continued)

(58) Field of Classification Search
CPC ............. F16K 15/063; Y10T 137/7929; Y10T 137/7931; Y10T 137/7936
(Continued)

(56) References Cited

U.S. PATENT DOCUMENTS 1,695,722 A * 12/1928 Smith .................... F16K 15/026
137/541
2,077,040 A * 4/1937 Creveling ............... F16N 21/02
184/105.3
(Continued)

FOREIGN PATENT DOCUMENTS

CN   101032078 A    9/2007
CN   203162256 U    8/2013
(Continued)

OTHER PUBLICATIONS

Office Action dated Nov. 29, 2018 for Chinese Application No. 2016800258665, 6 pages.
(Continued)

*Primary Examiner* — Robert K Arundale
(74) *Attorney, Agent, or Firm* — Patterson Thuente Pedersen, P.A.

(57) ABSTRACT

The invention relates to a valve comprising a tubular body in which a valve stem moves axially, the head of the stem cooperating with a corresponding seat on the valve body, said stem acting against a coiled spring that is housed in a chamber of circular cross-section and disposed between a bearing zone at a first end of the chamber and the stem in order to return the stem to the seat, said spring comprising: a first end with a large turn of a diameter substantially identical to a diameter of the chamber at the first end; and a second end with a small turn connected to the shank or head of the stem and a second large turn for centering and radial stabilization in the chamber.

9 Claims, 3 Drawing Sheets

(51) Int. Cl.
*F16K 17/06* (2006.01)
*F16F 1/08* (2006.01)
*F16K 1/02* (2006.01)
*F16K 1/20* (2006.01)
*F16F 1/02* (2006.01)
*F16K 31/56* (2006.01)

(52) U.S. Cl.
CPC .............. *F16K 17/06* (2013.01); *F16F 1/025* (2013.01); *F16K 31/566* (2013.01); *Y10T 137/7936* (2015.04)

(58) Field of Classification Search
USPC .............................................. 267/166.1, 180
See application file for complete search history.

(56) References Cited

U.S. PATENT DOCUMENTS

| | | | | |
|---|---|---|---|---|
| 2,784,737 A * | 3/1957 | Allcott | .................... | B61F 15/20 137/540.11 |
| 2,960,998 A * | 11/1960 | Sinker | .................... | F16K 15/026 137/542 |
| 3,034,869 A * | 5/1962 | Peterson | .................... | B01J 8/06 422/311 |
| 3,176,624 A * | 4/1965 | Sundholm | .................. | F16N 3/12 417/490 |
| 3,346,009 A * | 10/1967 | Lindeboom | ........... | F16K 15/026 137/543.17 |
| 3,379,213 A | 4/1968 | Billington | | |
| 4,195,656 A * | 4/1980 | Kanerva | ............ | G05D 16/0688 137/458 |
| 4,648,421 A * | 3/1987 | Chant | .................... | B65B 39/004 137/312 |
| 5,004,009 A * | 4/1991 | Bunce | .................. | B65B 39/004 137/494 |
| 6,250,336 B1 * | 6/2001 | Murphey | ................. | B60R 15/00 137/539 |
| 2008/0099322 A1 | 5/2008 | Romanowski | | |

FOREIGN PATENT DOCUMENTS

| | | |
|---|---|---|
| DE | 86323 | 4/1968 |
| DE | 102007041035 | 3/2009 |
| DE | 102008023296 | 11/2009 |

OTHER PUBLICATIONS

International Search Report and Written Opinion for International Application No. PCT/FR2016/050734 dated Sep. 1, 2016.

* cited by examiner

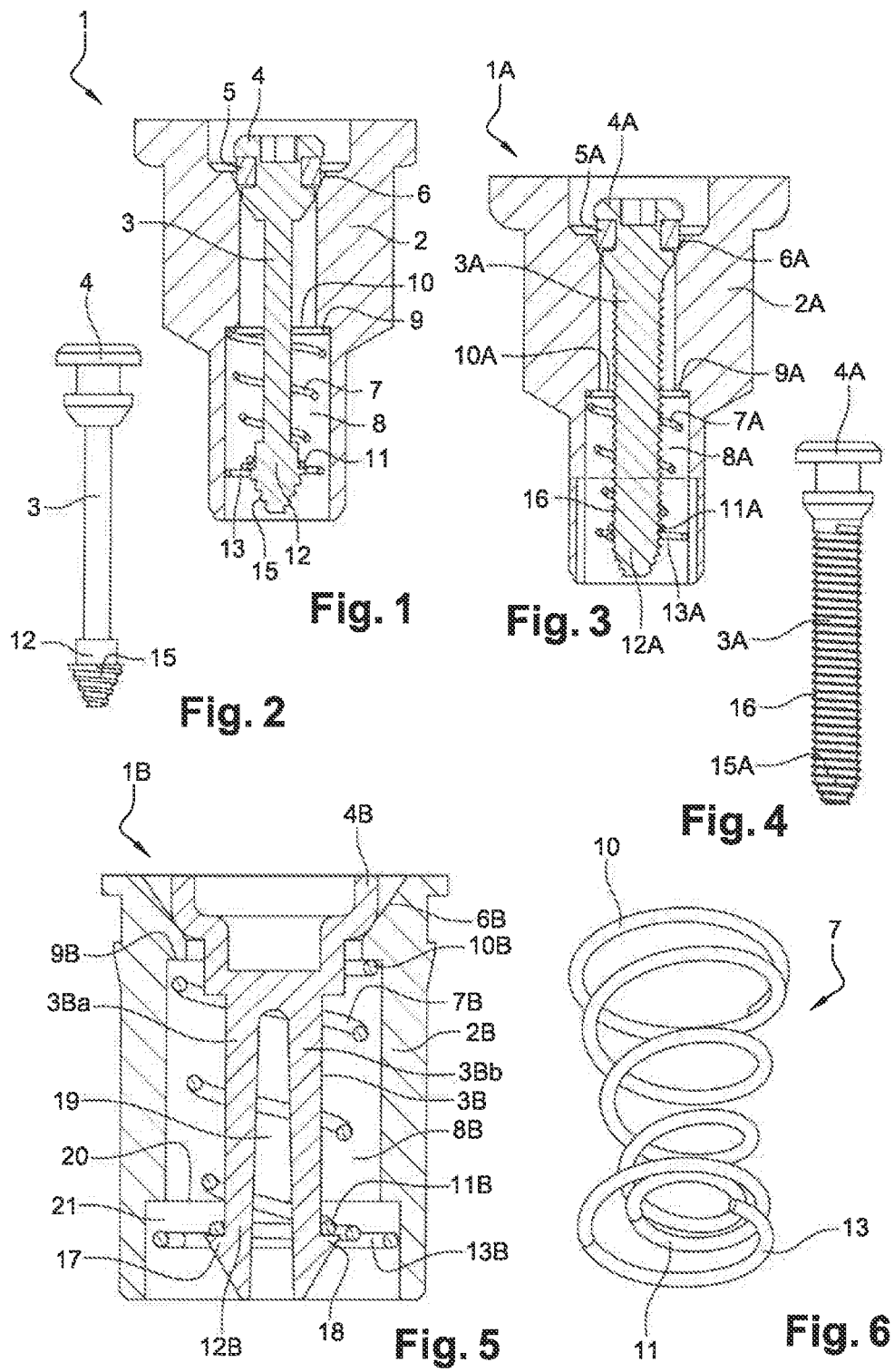

VALVE FOR PRESSURIZED ENVIRONMENTS

RELATED APPLICATIONS

The present application is a National Phase entry of PCT Application No. PCT/FR2016/050734, filed Mar. 31, 2016, which claims priority to FR 1553945, filed Apr. 30, 2015, the contents of each being incorporated herein by reference in their entireties.

TECHNICAL FIELD

The present invention relates to a valve subjected to pressurized environments, and the like, such as a charging valve, a check valve, an overpressure valve or a pressure regulator.

BACKGROUND ART

Known valves of this type include a tubular body in which a valve stem moves axially, the head whereof is provided or not with a sealing lining suitable for cooperating, in a sealed manner, with a corresponding seat of the valve body, the stem acting depending on a predetermined pressure, against a coiled spring housed in a chamber coaxial with the tubular body and disposed between a bearing zone with respect to it and the stem, to return the latter to the seat with a predetermined force.

For proper operation of these valves, it is necessary to provide for a certain number of functions: radial guidance of the valve head; initial sealing and sealing during re-closure; an optimized flow area; repeatability of the axial position of the valve head with the connector tappet in the case of charging valves; the possibility of adjusting the initial compression of the spring, in the case of pressure regulators, of overpressure valves and of differential valves; stoppage of translation by an abutment in the case of valves, of pressure regulators, of differential valves.

In the prior art, these functions are traditionally provided by the addition of a mechanism screwed, press fitted or clipped at the back of the valve.

When a defined opening pressure is to be satisfied, as is the case with overpressure valves, a screw, a nut, or a fitted ring allow the force of the spring to be adjusted.

This has the major disadvantage of complicating assembly by multiplying the number of parts constituting the valve.

SUMMARY OF THE INVENTION

Embodiments of the present invention aim to correct these disadvantages and relate, to this end, to a valve subjected to pressurized environments of the type including a tubular body wherein a valve stem can move axially, the head whereof is provided or not with a sealing lining suitable for cooperating, in a sealed manner, with a corresponding seat of the valve body, the stem acting depending on a predetermined pressure, against a coiled spring housed in a chamber of circular cross-section, coaxial with the tubular body and disposed between a bearing zone situated at a first end of the chamber and the stem, to return the latter toward the seat, with a predetermined force, wherein the return spring comprises:

a first end comprising a first large turn with a diameter substantially identical with a diameter of the chamber at the first end, the first large turn being arranged so as to bear on the bearing zone, and a second end including a small turn connected with the shank or the head of the stem and a second large turn for centering and radial stabilization in the chamber, coaxial with the small turn and having a diameter substantially identical with a second diameter of the chamber at a second end opposite to the first end of the chamber.

According to one embodiment, the return spring has a tapered cylindrical shape, the first large turn whereof constitutes the large base, while the small turn constitutes the small end and is continued, coaxially, by the second large turn.

According to a variant embodiment, this first end is terminated in the form of a spring having a substantially flat coiled portion which allows a coaxial guidance function to be conferred on this portion of the spring.

By tapered cylinder spring is meant a spring which includes at least one cylindrical portion and a conical portion.

Tests have allowed the following advantages to be identified:

The flow area is increased due to the use of the valve body as a mechanism body.

Sealing is improved. A single seal zone instead of two (plus the seat seal).

The assembly method is simplified as much as possible. It is sufficient to clip or to screw the valve into the spring, hence no crimping, no intermediate assembly.

Cleanliness, allowing severe specifications to be satisfied.

In the case of charging valves, pin overshooting is better controlled (the chain of dimensions is not as long) and the risk that the spindle will escape the tappet of the connector is reduced (continuous radial guidance of the spindle head by internal and/or external turns of the spring).

In the case of overpressure valves or differential valves, screwing the spindle of the valve into the spring allows calibration, without adding parts, to correct variations in force of the springs.

BRIEF DESCRIPTION OF THE FIGURES

Embodiments of the invention also relate to the features which will be revealed during the description which follows and which should be considered in isolation or according to any technically possible combinations.

This description, given by way of a non-limiting example, will allow a better understanding of how embodiments of the invention can be implemented with reference to the appended drawings wherein:

FIG. 1 is a schematic view in axial section of a valve according to the invention, according to a first embodiment.

FIG. 2 is a top view of the valve stem, according to the implementation of FIG. 1.

FIG. 3 is a schematic view in axial section of a valve according to the invention, according to a second embodiment.

FIG. 4 is a top view of the valve stem, according to the implementation of FIG. 3.

FIG. 5 is a schematic view in axial section of a valve according to the invention, according to a third embodiment.

FIG. 6 is a perspective view of the return spring according to a first variant embodiment of the invention.

DETAILED DESCRIPTION

Figure 7:
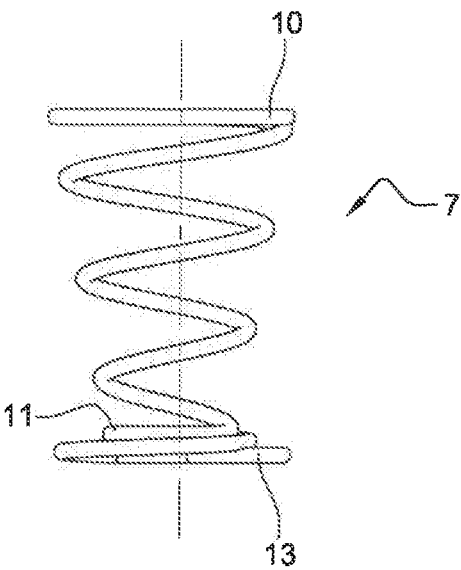
FIG. 7 is a top view of the spring according to FIG. 6, seen in perspective.
Figure 8:
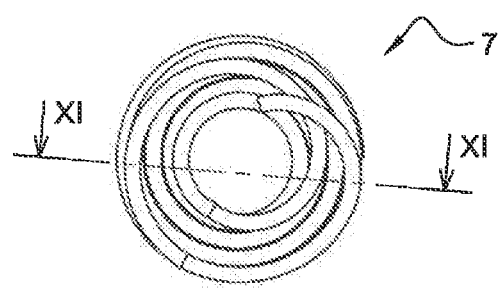
FIG. 8 is an end view of the spring according to FIG. 7.
Figure 9:
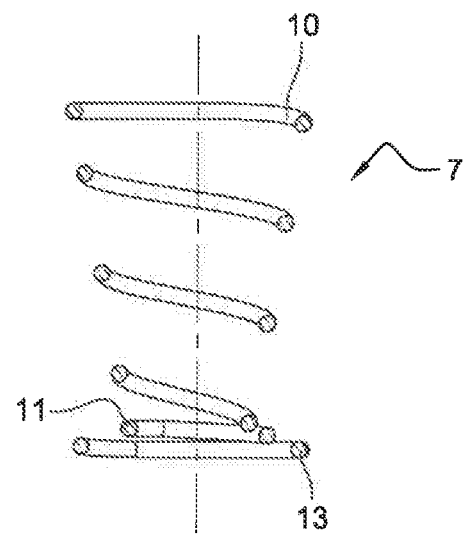
FIG. 9 is an axial section view of the spring along line IX-IX of FIG. 8.

The valve 1 designated overall in FIG. 1 includes a tubular body 2 wherein a valve stem 3 is able to move axially, the head 4 whereof is provided or not with a sealing lining 5 and suitable for cooperating, in a sealed manner, with a corresponding seat 6 of the valve body 2, the stem 3 acting depending on a predetermined pressure, against a coiled spring 7, 7A, 7B for example with a partially conical shape 7 housed in a chamber 8 of a circular section, coaxial with the tubular body 2 and disposed between a bearing zone 9 with respect to it and the stem 3, to return the latter toward the seat 6 with a predetermined force.

According to one implementation of the invention, the return spring 7, 7A, 7B has a tapered cylindrical shape, of which the turn constituting its large base 10, 10A, 10B is designed to bear on the bearing zone 9, 9A, 9B of the chamber 8, 8A, 8B of the body 2, 2A, 2B of the valve 1, while the turn 11, 11A, 11B constituting its small end is connected with the shank 12, 12A, 12B of the stem 3, 3A, 3B and continues concentrically with an enlarged turn 13, 13A, 13B for centering and radial stabilization in the chamber 8, 8A, 8B with a diameter substantially identical with it.

According to another feature of an embodiment of the invention, the chamber 8, 8A, 8B of the body 2, 2A, 2B wherein the tapered cylindrical spring 7, 7A, 7b is housed, forms a housing having a coaxial shoulder 9, 9A, 9B with a diameter substantially smaller than that of the large base 10, 10A, 10B of the spring 7, 7A, 7B, to constitute its fixed bearing zone, while centering the base in the chamber 8, 8A, 8B.

According to another feature, the end of the enlarged turn 13, 13A, 13B turns back toward the axis. Thus, when the enlarged turn is housed in the chamber, its end, which can be aggressive, is kept away from the wall of the chamber which protects it from aggressions which could slow the movement, scratch the chamber or generate chips compromising the cleanliness of the fluid.

According to the exemplary embodiment of FIGS. 1 and 2, the connection between the shank 12, 12A of the stem 3, 3A of the valve 4, 4A and the end turn constituting the small base 11, 11A of the tapered cylindrical spring 7, 7A is accomplished by a conical and threaded end zone 15, 15A of the shank 12, 12A with dimensions such as to allow it to be screwed or clipped to the end turn of the spring constituting the small base 11, 11A, serving as a helical thread or circlip.

The exemplary embodiment shown in FIGS. 3 and 4 differs essentially from the foregoing in that the conical and threaded end zone 15A of the stem 3A of the valve 4A is continued by a cylindrical threaded zone 16 along which the end turn of the spring constituting its small base 11 can be screwed, so as to allow the adjustment of the force of the spring 7A thereof or the opening pressure of the valve 4A.

According to an exemplary embodiment not shown, the connection between the shank 12 of the stem 3 of the valve and the end turn constituting the small base 11 of the tapered cylindrical spring 7 is accomplished by mechanical deformation of the end of the shank 12 of the stem 3, to a diameter greater than the small base of the spring 7.

According to the exemplary embodiment shown in FIG. 5, this one differs from the foregoing in that the connection between the shank of the stem 12B of the valve and the end turn constituting the small base 11B of the tapered cylindrical spring is accomplished by two shoulders 17, 18 contained within a cone or cone frustum made at the ends of two arms 3Aa, 3Ab forming the stem 3, separated by a longitudinal slot 19, so as to make them elastically deformable and allow the assembly or disassembly with respect to the small base 11B of the spring 7B.

According to a variant embodiment, the longitudinal slot 19 may not be present in the cone or the cone frustum, the assembly of the spring 7B being achievable by spreading or elastic deformation of the turns of the spring 7B.

According to this embodiment, the chamber 8B of the body 2B wherein the tapered cylinder spring 7B is housed, is continued by a second chamber 21 larger than the one 8B and defines a second coaxial shoulder 20, with a diameter substantially smaller than that of the enlarged turn 13B, continuing the turn constituting the small base of the spring 11B, so as to control the axial travel of the valve stem 3B, within a predetermined range, while ensuring its centering and its radial stabilization.

Figure 10:
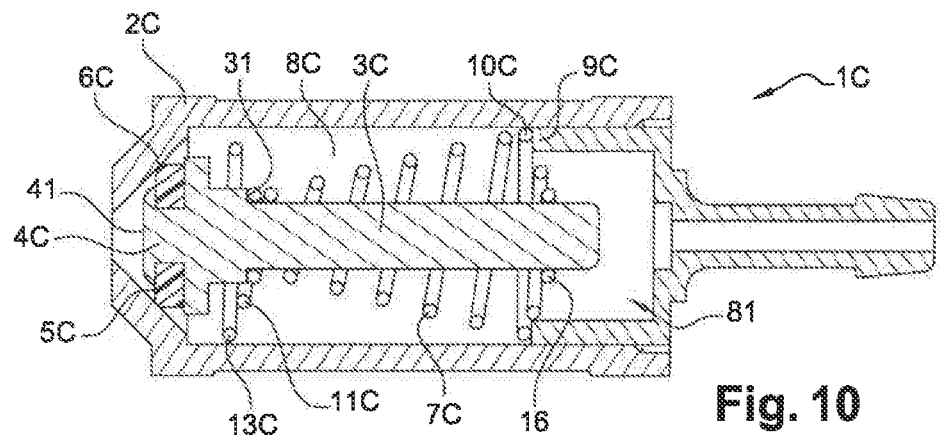
FIG. 10 is a schematic section view of a valve according to the invention, according to a fourth embodiment.
Figure 11:
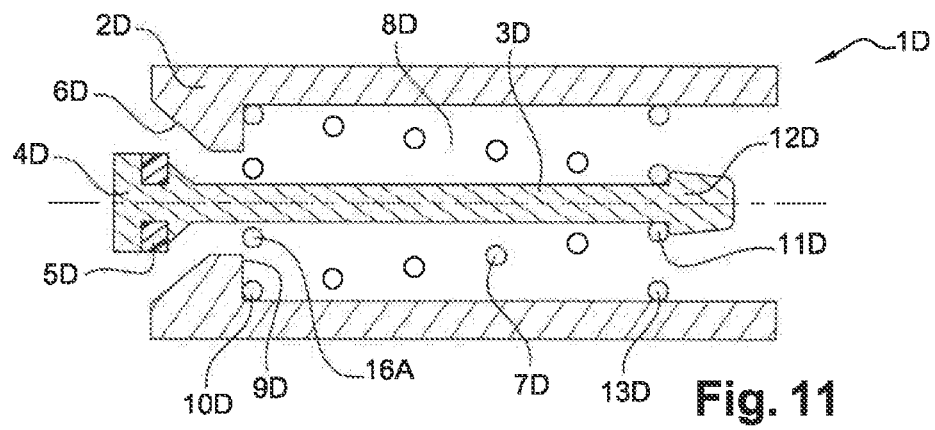
FIG. 11 is a schematic section view of a valve according to the invention, according to a fifth embodiment.
Figure 12:
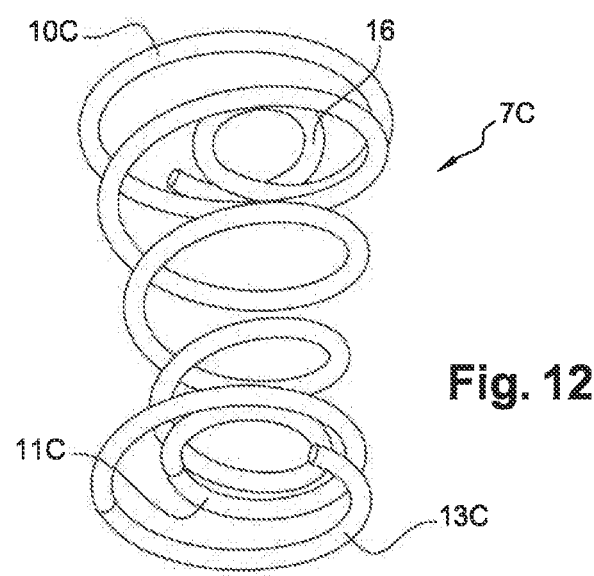
FIG. 12 is a perspective view of a return spring according to a second variant embodiment of the spring of the invention.

In the exemplary embodiments shown in FIGS. 10 and 11, the return spring 7C; 7D has the shape shown by FIG. 12. This spring 7C; 7D differs from the spring shown in FIGS. 6 to 9 by the fact that the large turn 10C; 10D constituting its large base is continued by a second small turn 16; 16A. In this example, the second small turn 16; 16A has a diameter substantially identical with the diameter of the small turn 11C; 11D forming the small base.

In other variant embodiments, not shown, the second small turn 16 has a different diameter from the diameter of the small turn 11 forming the small base.

In the exemplary embodiment of FIG. 10, the valve stem 3C is arranged so as to be able to move axially in the chamber 8C. The spring 7C returns the stem to the head. To accomplish this, the large base 10C of the spring 7C bears on the shoulder 9C and the small turn 11C bears on a second shoulder 31 formed on the step 3C near the head 4C. The action of the spring 7C on the stem allow the outer wall 41 of the head to be pressed against the seat 6C; more precisely, it is the sealing lining 5C which comes into contact with the seat 6C to ensure a better seal.

In operation, when the valve IC is subjected to a pressure exceeding a certain predetermined threshold, the stem 3C is pushed toward an end 81 of the chamber 8C. While it is sliding, the second small turn 16 serves as its guide, which allows the coaxial centering of the stem to be ensured. Thereafter, the stem returns to its initial position when the pressure is again below the predetermined threshold.

In the exemplary embodiment of FIG. 11, the general form of the valve 1D is similar to that of FIG. 1. The valve stem 3D is arranged so as to be able to move axially in the chamber 8D and the spring 7D returns the stem to the shank to bring it back to the closed position.

The large base 10D of the spring 7D bears on the shoulder 9D and the small turn 11D bears on a second shoulder formed on the stem 3D at the shank 12D.

The action of the spring 7D returning the stem 3D allows the head 4D and the sealing lining 5D to be pressed against the seat 6D.

In the last two exemplary embodiments, the second small turn 16, 16A serves as a guide and stabilization turn for the shank or head of the stem.

These last two exemplary embodiments have the advantage of having dual guidance of the stem which ensures closure of the valve in a coaxial position. This also allows having guidance without risk of bowing thanks to dual centering by the small turns.

The opening pressure can be calibrated by adjusting the position of the restraint of the spring on the body, particularly by controlling the positions of the shoulders.

According to one embodiment, the chamber has a cylindrical shape.

In the exemplary embodiments shown above, the spring has a tapered cylindrical shape; these exemplary embodiments, however, are not limiting and the spring can have a different shape.

According to a final feature, the end of the second small turn 16 moves away from the axis. Thus, when one of the shank or the head of the stem slides in this small turn, according to a variant embodiment not illustrated here, its end which can be aggressive is moved away from the wall of the stem, which protects it from aggressions which could slow the movement, scratch the stem or generate chips compromising the cleanliness of the fluid.

The invention claimed is:

1. A valve subjected to pressurized environments of the type including a tubular body and a valve stem received with the tubular body, the valve stem shiftable along the axis of the tubular body, the head whereof is provided or not with a sealing lining adapted for cooperating, in a sealed manner, with a corresponding seat of the valve body, said stem acting depending on a predetermined pressure, against a coiled spring housed in a chamber of circular cross-section, coaxial with the tubular body and disposed between a bearing zone situated at a first end of the chamber and the stem, to return the latter toward the seat, with a predetermined force, wherein the return spring comprises:

a return spring first end comprising a return spring first end first turn with a diameter similar to a diameter of the chamber at the first end of the chamber, said first return spring first end first turn being arranged so as to bear on the bearing zone, and a return spring second end including a return spring second end first turn, the return spring second end first turn being smaller than the return spring first end first turn, the return spring second end first turn connected with the shank or the head of the stem, the return spring second end further including a return spring second end large turn for centering and radial stabilization in said chamber, the return spring second end large turn being coaxial with the return spring second end first turn and having a diameter similar to a second diameter of the chamber at a second end of the chamber opposite to the first end of the chamber, wherein the return spring first end comprises a return spring first end second end turn coaxial with the return spring first end first turn, said return spring first end second end turn connecting with the shank or the head of the stem, the return spring first end second end turn being smaller than the return spring first end first turn.

2. The valve according to claim 1, wherein the return spring has a tapered cylindrical shape, the return spring first end first turn constitutes a base of the tapered cylindrical shape, while the return spring second end first turn constitutes a smaller end of the tapered cylindrical shape, the smaller end being continued, coaxially, by the return spring second end large turn.

3. The valve according to claim 2, wherein the chamber of the body wherein the tapered cylinder spring is housed, forms a housing having a coaxial shoulder with a diameter similar to that of the base of the spring, to constitute its fixed bearing zone, while centering said base in the chamber.

4. The valve according to claim 2 wherein the connection between the shank of the stem of the valve and the return spring second end first turn of the tapered cylinder spring is accomplished by a conical and threaded end zone of said shank, with dimensions such as to allow it to be screwed or clipped into the return spring second end first turn, serving as a helical thread or circlip.

5. The valve according to claim 4, wherein the conical and threaded end zone of the stem of the valve is continued by a cylindrical threaded zone along which the return spring second end first turn is threadably receivable, so as to allow the adjustment of the force of the spring thereof or of the opening pressure of the valve.

6. The valve according to claim 2, wherein the connection between the shank of the stem of the valve and the return spring second end first turn of the tapered cylinder spring is accomplished by mechanical deformation of the end of the shank of the stem, to a diameter greater than the return spring second end first turn of the spring.

7. The valve according to claim 2, wherein the connection between the shank of the stem of the valve and the return spring second end first turn of the tapered cylinder spring is accomplished by two shoulders contained within a cone or cone frustum made at the ends of two arms forming the stem, separated by a longitudinal slot so as to make them elastically deformable and allow the assembly or disassembly with respect to the return spring second end first turn of the spring.

8. The valve according to claim 1, wherein the second end large turn presents a second end large turn end that turns back toward the axis.

9. The valve according to claim 1, wherein the end of the return spring first end second end turn moves away from the axis.

* * * * *